United States Patent Office 2,980,680
Patented Apr. 18, 1961

2,980,680

SEPARATION OF ISOPROPANOLAMINE FROM DIMETHYLPYRAZINES AND DIMETHYLPIPERAZINES

George W. Fowler, South Charleston, W. Va., assignor to Union Carbide Corporation, a corporation of New York No Drawing. Filed Nov. 26, 1956, Ser. No. 624,193

9 Claims. (Cl. 260—268)

This invention relates to the manufacture of 2,5-dimethylpiperazines and more particularly to a novel method of removing isopropanolamine from 2,5-dimethylpiperazines and pyrazines to produce highly refined products.

Dimethylpiperazines are useful monomers in the synthesis of a variety of polymeric products. These compounds are in effect difunctional secondary amines and are reactive with dicarboxylic acids to form polyamide resins and with diisocyanates to form polyurethanes. Also dimethylpiperazines may be used as starting materials in the preparation of various pharmaceutical products. The preferred starting material for most of these syntheses is trans-2,5-dimethylpiperazine and it is important that this starting compound be in substantially pure form, since an impure monomer may lead to the production of an inferior polymer.

In a number of the methods that have been proposed for making 2,5-dimethylpiperazines in general and trans-2,5-dimethylpiperazine in particular, isopropanolamine is used as a starting material. In some cases the conversion of isopropanolamine to dimethylpiperazines is effected in a single step, whereas in other cases dimethylpyrazine is first formed and then the pyrazine is hydrogenated in a separate step to the dimethylpiperazine. In either event the reaction product may contain unreacted isopropanolamine which is rather difficult to separate from dimethylpiperazines.

In cases where the desired end product is high purity trans-2,5-dimethylpiperazine, the two-step process referred to provides certain advantages in terms of yield and product purity, particularly freedom from undesired isomers. The dimethylpyrazine produced in the first step of this process may be advantageously made, for example, by the dehydrogenation, condensation and cyclodehydration of isopropanolamine according to the method disclosed in the copending application of Benjamin T. Freure, Serial No. 514,123, filed June 8, 1955. The product thus obtained is mostly 2,5-dimethylpyrazine mixed with a minor amount of 2,5-dimethylpiperazines and a small quantity of unreacted isopropanolamine. It has been found that this isopropanolamine tends to impair the activity of the catalyst used in the second step of the process, i.e. the hydrogenation of the pyrazine to the piperazine, and also produces undesired impurities in the reaction products. Hence it is desirable in this two-step process that the mixture of pyrazines and piperazines from the first step be freed from isopropanolamine before the second or hydrogenation step is carried out. The refining of this mixture of pyrazines and piperazines can be conveniently effected by the present method.

It is accordingly an object of the present invention to provide an improved method of separating isopropanolamine from dimethylpiperazines and dimethylpyrazines.

The present invention is based, in part, upon the discovery that isopropanolamine can be effectively separated from 2,5-dimethylpyrazines, 2,5-dimethylpiperazines and mixtures thereof by azeotropic distillation with any of various volatile liquid hydrocarbons such as VMP naphtha, nonane, or a lower alkyl benzene, e.g. isopropylbenzene, ethylbenzene, diethylbenzene, toluene or the like. Such hydrocarbons boil within the range 100° C. to 200° C. at atmospheric pressure.

To effect this separation, the mixture of monoisopropanolamine and dimethylpiperazine, which may or may not contain dimethylpyrazine as well is mixed with about 20% of its weight of the liquid hydrocarbon and distilled in a reflux still. The condensate separates into two layers and the upper layer containing most of the hydrocarbon is returned to the still as reflux. Improved separating efficiency can be achieved by passing the condensed distillate through a water-filled scrubber to cause monoisopropanolamine to be washed therefrom before the hydrocarbon layer is returned to the still, but such water washing of the distillate is not essential to effect the desired separation. Distillation is continued until the isopropanolamine has been completely removed from the material in the still kettle. In cases where the distillate is water-washed, complete removal of the isopropanolamine is indicated by the fact that the weight of the wash-water remains substantially constant.

When removal of the isopropanolamine is complete, the liquid hydrocarbon is separated from the dimethylpiperazine or mixture of dimethylpiperazine and dimethylpyrazine by fractional distillation. If the nature of the liquid hydrocarbon used is such that its boiling point is substantially different from that of the dimethylpiperazine and/or dimethylpyrazine, this separation can be effected without addition of a third component to the mixture. However, if the boiling points of the liquid hydrocarbon and piperazine or pyrazine are relatively close together, it is desirable to add to the mixture a quantity of water sufficient to permit removal of the hydrocarbon as a water-hydrocarbon-azeotrope. The hydrocarbon is then removed as the upper layer of this water-hydrocarbon-azeotrope and the water layer returned to the still. After disappearance of the hydrocarbon layer the water present can be removed by distillation.

In order to point out more fully the nature of the present invention, the following specific examples are given of illustrative embodiments of the invention:

Example 1

A quantity of 2,5-dimethylpyrazine prepared according to the process of application Serial No. 514,123 referred to above was mixed with about 20% of its weight of VMP naphtha having a boiling point of 110°–120° C. and distilled in a reflux still. The condensed distillate was passed upwardly through a scrubber containing a predetermined quantity of water to dissolve monoisopropanolamine from the distillate, and the naphtha layer was returned to the still. The wash water was replaced by fresh water from time to time and the removed water was weighed to determine its monoisopropanolamine content. Distillation was continued until the increase in weight of the water removed was negligible. Thereafter, the naphtha and 2,5-dimethylpyrazine were separated by fractional distillation. The resulting mixture of 2,5-dimethylpyrazine and dimethylpiperazines was found to be substantially free from monoisopropanolamine.

The isopropanolamine-free mixture of dimethylpyrazine and dimethylpiperazine was vaporized, mixed with hydrogen and passed through a nickel catalyst bed at the rate of 150 grams of vapor and 150 to 200 liters of hydrogen per hour per liter of catalyst. The temperature was maintained at 155°–160° C. and the reaction was continued for a period of 3 days. At the end of this period analysis of the reaction product showed that an average yield of 29% of trans-2,5-dimethylpiperazine had been achieved.

The trans-2,5-dimethylpiperazine was separated by filtration and the filtrate was recycled over the catalyst to cause the cis-2,5-dimethylpiperazine contained therein to be isomerized to the trans-form. Before recycling the filtrate, the catalyst was reactivated by treatment with hydrogen at 370°–380° C. for about 24 hours. The vaporized filtrate was fed to the catalyst bed at a rate of about 150 grams per hour per liter of catalyst and the temperature was maintained at 155°–160° C. It was found that about two-thirds of the cis-compound was converted to the trans-compound. Moreover, the trans-compound in this product could be removed and the remaining material again recycled over the catalyst to obtain substantially the same degree of isomerization of cis-compound to trans-compound. Thus the reaction products can be recycled a number of times with intermediate removal of the trans-compound to achieve a relatively high yield of the desired product.

*Example 2*

There was charged to a rocking autoclave 1026 grams of monoisopropanolamine and 50 grams of wet Raney nickel. (Because of its pyrophoric character, Raney nickel is usually weighed wet with water; it commonly contains 60% to 80% metallic nickel.) Hydrogen was passed into the autoclave until a pressure of 400 pounds per square inch gauge was obtained after which the autoclave was heated to a temperature of 172° C. When this temperature was reached the pressure was 700 pounds per square inch gauge. More hydrogen was added to increase this pressure to 1100 pounds per square inch gauge and the temperature was maintained between 172° C. and 182° C. for a period of 6.25 hours, at the end of which period the pressure had decreased to 900 pounds per square inch gauge.

In a second and similar run 1220 grams of monoisopropanolamine were added to a rocking autoclave together with 50 grams of Raney nickel, the nickel being weighed wet with water. The temperature was maintained between 175° C. and 182° C. for a period of 6 hours. The pressure at the end of this period was 1200 pounds per square inch gauge.

The products from each of the above runs were separately distilled azeotropically with toluene to separate water therefrom. The azeotropic distillate thus obtained separated into top and bottom layers and the top layers were continuously recycled to the top of the distillation column for further distillation. After the azeotropic distillation was complete the residues remaining were cooled and solid trans-2,5-dimethylpiperazine crystallized from the liquid reaction products. The trans-compound was separated from each reaction product by filtration. The filtrates from the two runs containing cis-2,5-dimethylpiperazine were combined and the toluene was distilled from them with temperatures at the top of the distillation column up to 135° C. Unreacted isopropanolamine was removed as a toluene-isopropanolamine azeotrope during this distillation.

After removal of the toluene, the filtrate remaining as residue was treated to isomerize further quantities of the cis-isomer therein to the trans-form and the trans-isomer was recovered in the manner described above.

*Example 3*

Fifty grams of monoisopropanolamine and 50 grams of isopropylbenzene were charged to a still and distilled. The distillate obtained at a temperature of 136° to 137° C. (as compared to a boiling point for monoisopropanolamine of 159.9° C. and of isopropylbenzene of 153° C.) was found to be heterogeneous when condensed and cooled, separating into two layers. The top layer was continuously recycled to the still for further distillation. The distillation was halted when five grams of bottom layer had been obtained and this five gram sample of the bottom layer of the condensate was titrated with aqueous mineral acid and found to have an equivalent weight of 94.6.

To the still kettle was then added 50 grams of 2,5-dimethylpiperazine crystals and distillation was resumed. A five gram sample of the bottom layer of the distillate was again obtained and titrated as above and found to have an equivalent weight of 88.3. The distillation was continued and another 56 grams of bottom layer of distillate were obtained and titrated and found to have an equivalent weight of 90.7. Since the equivalent weight of the bottom layer was about the same whether or not the kettle contained dimethylpiperazine, it is apparent that the isopropylbenzene azeotrope provides an effective means of separating isopropanolamine from piperazines.

*Example 4*

One hundred and sixty-eight grams of a crude mixture of monoisopropanolamine and by-product 2,5-dimethylpiperazine and 100 grams of diethylbenzene were charged to a distillation column and distilled with temperatures at the top of the distillation column up to 153° C. A heterogeneous condensate was thus obtained which formed a total bottom layer of 48 grams after cooling. The top layer that formed was continuously recycled to the top of the distillation column. This 48-gram sample was diluted with water, which caused the diethylbenzene present to form a top layer. The bottom layer formed was distilled under a vacuum to remove the water therefrom leaving 31 grams of residue having an equivalent weight of 91.5. It thus appears that diethylbenzene is similarly effective in carrying out this azeotropic separation.

*Example 5*

Sixty-three grams of a mixture containing by weight 75.8 percent monoisopropanolamine and 24.2 percent 2,5-dimethylpiperazine was charged to a distillation column together with 78 grams of ethylbenzene. The mixture was distilled and the distillate obtained with a temperature at the top of the distillation column up to 132° C. was a heterogeneous condensate which formed two layers. The top layer was continuously recycled to the distillation column and a bottom layer weighing 61 grams was collected. This 61 gram sample was diluted with water and 18 grams of ethylbenzene were then decanted from it leaving 43 grams of monoisopropanolamine in the water layer, that is, more than 90% of the monoisopropanolamine present in the original mixture.

*Example 6*

135 grams of a mixture consisting by weight of 75.8 percent monoisopropanolamine and 24.2 percent 2,5-dimethylpiperazine were charged to a distillation column together with 75 grams of nonane. The mixture was distilled and the distillate obtained with a temperature at the top of the distillation column from 124° C. up to 143° C. was heterogeneous and separated into a viscous bottom layer and a thin top layer, the top layer being returned to the top of the distillation column continuously. The observed boiling point was about 130° C. for the major part of this portion of the distillation. The bottom layer collected contained nearly all of the monoisopropanolamine present in the original mixture.

It is of course to be understood that the foregoing examples are illustrative only and that numerous changes can be made in the materials, proportions, and conditions set forth without departing from the spirit of the invention as set forth in the appended claims.

This application is a continuation-in-part of my prior application Serial No. 564,359, filed jointly with Donald G. Crosby and William R. Proops, now Patent No. 2,920,076.

I claim:

1. A method of separating isopropanolamine from a mixture thereof with 2,5-dimethylpiperazine, which comprises adding to the mixture ethylbenzene, heating the mixture and distilling therefrom an azeotrope consisting predominantly of isopropanolamine and ethylbenzene.

2. A method of separating isopropanolamine from a mixture thereof with 2,5-dimethylpiperazine which comprises adding to the mixture a volatile liquid hydrocarbon azeotroping agent which boils within the range 100° C. to 200° C. at atmospheric pressure, heating the mixture and distilling therefrom an azeotrope consisting predominantly of isopropanolamine and said liquid hydrocarbon azeotroping agent.

3. A method according to claim 2 and wherein said liquid hydrocarbon is naphtha.

4. A method according to claim 2 and wherein said liquid hydrocarbon is nonane.

5. A method of separating isopropanolamine from a mixture thereof with 2,5-dimethylpiperazine which comprises adding to the mixture a lower alkyl benzene which boils within the range 100° C. to 200° C. at atmospheric pressure, heating the mixture and distilling therefrom an azeotrope consisting predominantly of isopropanolamine and said lower alkyl benzene.

6. A method according to claim 5 and wherein said alkyl benzene is toluene.

7. A method according to claim 5 and wherein said alkyl benzene is isopropylbenzene.

8. A method according to claim 5 and wherein said alkyl benzene is diethylbenzene.

9. A method of separating isopropanolamine from a mixture thereof with 2,5-dimethylpiperazine which comprises adding to the mixture a volatile liquid hydrocarbon selected from the group consisting of lower alkyl benzenes and aliphatic hydrocarbons having boiling points between 100° C. and 200° C. at atmospheric pressure, heating the resulting mixture and distilling therefrom an azeotrope consisting predominantly of isopropanolamine and said liquid hydrocarbon.

No references cited.